United States Patent [19]

Davies

[11] E Patent Number: Re. 32,595

[45] Reissued Date of Patent: Feb. 9, 1988

[54] PROCESS FOR MAKING A LAMINATED BEARING UTILIZING PLASTICS ALLOY COMPOSITIONS

[75] Inventor: Glyndwr J. Davies, Uxbridge, England

[73] Assignee: AEPLC, Rugby, England

[21] Appl. No.: 824,798

[22] Filed: Feb. 5, 1986

Related U.S. Patent Documents

Reissue of:

[64] Patent No.: 4,421,588
Issued: Dec. 20, 1983
Appl. No.: 435,970
Filed: Oct. 22, 1982

[30] Foreign Application Priority Data

Oct. 22, 1981 [GB] United Kingdom ..... 8131821

[51] Int. Cl.[4] ..... B32B 31/20

[52] U.S. Cl. ..... 156/308.2; 29/149.5 NM; 384/297; 384/909; 384/910; 427/195; 427/388.1; 428/419; 524/299; 525/471; 525/537; 525/934

[58] Field of Search ..... 156/308.2; 427/195, 427/388.1; 428/419; 29/149.5 NM; 524/299; 525/471, 934, 537; 384/297, 910, 909

[56] References Cited

U.S. PATENT DOCUMENTS

| | | | |
|---|---|---|---|
| 2,789,957 | 4/1957 | Pollock | 524/299 |
| 4,017,555 | 4/1977 | Alvarez | 525/537 |
| 4,021,596 | 5/1977 | Bailey | 428/419 |
| 4,193,645 | 3/1980 | Baker et al. | 428/419 |
| 4,386,118 | 5/1983 | Young | 427/388.1 |

*Primary Examiner*—John J. Gallagher
*Attorney, Agent, or Firm*—Price, Heneveld, Cooper, DeWitt & Litton

[57] ABSTRACT

A plastics alloy for a bearing material comprising polyphenylene sulphide and polyether ether ketone. The alloy is formed by powder mixing, melt blending or solvent blending and applied to a metal backing either as a sheet, or in solution or in powder form. The alloy is heated and roll bonded to the backing.

14 Claims, No Drawings

PROCESS FOR MAKING A LAMINATED BEARING UTILIZING PLASTICS ALLOY COMPOSITIONS

Matter enclosed in heavy brackets [ ] appears in the original patent but forms no part of this reissue specification; matter printed in italics indicates the additions made by reissue.

BACKGROUND OF THE INVENTION

The present invention relates to plastics alloy compositions for example for use as a bearing material, either as a lining or as an overlay. The invention is particularly concerned with lubricated plastics bearing materials.

Plastics bearing materials are known in themselves, however, some suffer from poor fatigue strength and so are unsuitable under certain conditions, while others suffer from overheating sometimes due to an inability to form an effective lubricant film.

SUMMARY OF THE INVENTION

It is an object of the present invention to provide a plastics bearing material which exhibits high fatigue strength and which does not suffer excessively from overheating.

According to the present invention, there is provided a plastics alloy, for example, for use as a bearing material, the alloy comprising a polyarylene sulphide and an aromatic polyether ketone.

The polyarylene sulphide is preferably polyphenylene sulphide and may be present in an amount of from 5 to 95% by weight, preferably, 20 to 50% by weight. The polyether ketone is preferably polyether ether ketone but may be a copolymer of an aromatic polyetherketone with an aromatic polysulphone or sulphide. Thus, the second polymeric component of the alloy is preferably a linear, semi-crystalline polymer containing the repeating units:

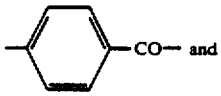

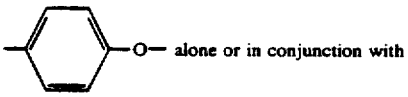

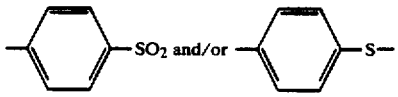

The morphology of the alloy can be semi-cyrstalline or amorphous, and it may be a single phase material or a fine dispersed polyphenylene sulphide phase in a matrix of the semi-crystalline second phase.

The alloy may be produced in a number of ways. One such way is solvent blending. In this method, hot solutions of the two polymers in the same solvent are mixed and the solvent is subsequently removed. This may be carried out by distillation or solvent extraction, thus leaving the polymer alloy. A preferred solvent is benzyl benzoate.

Another production method is melt blending. In this case the two polymers are melted and thoroughly mixed together in an internal mixing machine. Reactive additions (e.g. sulphur) can be made to promote some graft co-polymerisation by a free-radical mechanism between the component polymers to aid compatibility.

Free-radical initiating compounds can also be added to the mixed solutions in a solvent blending process. Such materials include those capable of producing thiyl free radicals, for example phenyl disulphide,

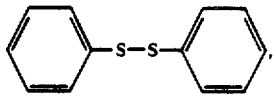

in order to initiate some graft co-polymerisation between the component polymers and so enhance compatibility.

The alloy may be applied as an overlay by any known suitable method but is preferably applied by a solvent coating method. When used as an overlay, the alloy is preferably applied to an existing layer of bearing material.

When intended for use as a bearing lining, the alloy may be applied to a plain metal e.g. an aluminium alloy backing or a steel backing with an aluminium alloy bonding layer or a sintered (e.g. bronze) backing. The alloy may be applied in sheet form, as a powder or in solution.

When applied as a sheet, the polymer may be extruded and bonded to the backing simultaneously or may be extruded as a sheet and subsequently pressure bonded or roll bonded to a heated backing.

When used as a powder, either for direct application or for forming into a sheet, the alloy is preferably predried[,]; when applied as a powder to a backing, the alloy may be spread on the backing using a vibrating feed hopper. The backing is preferably heated until the alloy melts and the alloy may then be roll bonded to the backing.

The alloy may be pressure bonded either as a sheet or when in powder form. In this method the backing may be formed into the desired shape and placed in a mould. The alloy is then placed on top of the backing, either as a sheet of the correct shape, or as a powder in the desired quantity, and subsequently pressure bonded. This method is particularly suitable for forming flat bearings such as thrust pads or washers.

When the alloy is applied in solution, this may be carried out by any suitable method, for example, dipping, spraying, roller coating or spreading.

Further components may be added to the two component alloys though preferably such an addition is a co-polymer of the two main components.

The alloy may be used for bearing bushes half-bearings, thrust pads, pads for journal bearings, slides for machine tools and marine stern bearings. The alloy may also be applicable generally to any two relatively sliding surfaces such as pistons operating in cylinders and most applications in internal combustion engines. The use of the alloy, however, is not intended to be limited to bearings.

DESCRIPTION OF THE PREFERRED EMBODIMENTS

The invention may be carried into practice in various ways and will now be illustrated in the following non-limiting examples.

EXAMPLE 1

Alloy compositions were made by solution blending PPS and PEEK using diphenyl sulphone as a mutual solvent with a small reactive addition of diphenyl disulphide. A glass reaction vessel equipped with a nitrogen inlet, a condenser column and a stirring device was charged with 500 grams of melted diphenyl sulphone and held at 300° C. 100 grams of powdered PPS made as described in U.S. Pat. No. 3,919,177 of inherent viscosity of at least 0.20, and 100 grams of PEEK (ICI grade 45P) were slowly added while the mixture was stirred vigorously under a blanket of nitrogen. When all of the solid was in solution 2 grams of diphenyl disulphide powder was added and the temperature was raised to 320° C. for 15 minutes, then the mixture was cooled, the diphenyl sulphone was removed by washing with acetone (twice) the resulting solid was milled to pass a BS 44 mesh sieve then washed again with acetone (twice) and dried at 150° C. under vacuum. The polymer alloy powder was fabricated into a test bearing lining in the following manner. The backing used was a 1½ mm steel strip having a 5 micron copper plated overlayer and a porous layer of 11% tin/bronze (BS 60–100 mesh sieve) ½ mm thick sintered to the copper. The predried polymer powder was spread to a thickness of 1½ mm by means of a vibrating feed hopper onto the substrate and then heated by induction heating to a temperature of between 360° C. and 370° C. The blank was rolled to consolidate the powder into a continuous coherent lining. The coated blank was then rapidly cooled and formed into a bearing.

EXAMPLE 2

Alloy compositions were prepared by melt extrusion of PPS and PEEK with small reactive additions of elemental sulphur and diphenyl disulphide. 5 kg. of PEEK (ICI grade 45P) and PPS powder (high molecular weight grade, of inherent viscosity at least 0.2 prepared as described in U.S. Pat. No. 3,919,177) were ball milled together with 100 grams of flowers of sulphur and 100 grams of diphenyl disulphide powder.

The mixture then was compounded together in the melt phase using a conventional melt extrusion apparatus. The resulting blend was extruded into the form of a strand which upon solidification was broken up into granules. The granules were then extruded again into continuous tape 15 cm wide 500 microns thick. The backing used was continuous copper plated steel strip with bronze powder sintered onto one side as described in Example 1. This backing strip was preheated to 360° C. to 380° C. by passing it through an induction heating coil, and with the polymer tape on top of it, passed into a rolling mill. The roll bonded strip was then rapidly water quenched and coiled. Bearing components were formed from the steel backed polymer alloy.

What is claimed as new and desired to be secured by Letters Patent of the United States is:

1. A method of making a plain bearing comprising a plastics alloy bearing layer and a metal backing, the method including the steps of mixing together a polyarylene sulphide and a polyether ketone to form an alloy, applying said alloy to said metal backing and bonding said alloy to said backing.

2. A method according to claim 1 wherein said alloy is formed by solvent blending.

3. A method according to claim 2 wherein said solvent is a benzyl benzoate.

4. A method according to claim 1 wherein said alloy is formed by melt blending.

5. A method according to any one of claims 1 or 4 wherein said alloy is applied to said backing as a sheet and roll bonded.

6. A method according to claim 1 wherein said alloy is formed by powder mixing.

7. A method according to any one of claims 1 or 4 or claim 6 wherein said alloy is applied to said backing in powder form and heated to bond it to said backing.

[8. A plastics alloy comprising a polyarylene sulphide and an aromatic polyether ketone.]

[9. An alloy according to claim 8 wherein said polyarylene sulphide is polyphenylene sulphide.]

[10. An alloy as claimed in claim 9 in which the polyphenylene sulphide comprises from 20 to 50% by weight of the alloy.]

[11. An alloy according to any one of claims 8, 9 and 10 wherein said polyether ketone is polyether ether ketone.]

*12. A laminated bearing comprising a metal backing member and a plastics alloy bearing member of a polyarylene sulphide and an aromatic polyether ketone bonded to said backing member.*

*13. A laminated bearing according to claim 12 wherein said polyarylene sulphide is polyphenylene sulphide.*

*14. A laminated bearing as claimed in claim 13 in which polyphenylene sulphide comprises from 20 to 50% by weight of the alloy forming the bearing member.*

*15. A laminated bearing according to any one of claims 12, 13 or 14 wherein said polyether ketone is polyether ether ketone.*

*16. A laminated bearing as claimed in claim 12 wherein the plastics alloy is one formed by solvent blending.*

*17. A laminated bearing as claimed in claim 16 wherein the solvent is benzyl benzoate.*

*18. A laminated bearing as claimed in claim 12 wherein the plastics alloy is one formed by powder mixing or melt blending.*

* * * * *